United States Patent [19]

Gallo et al.

[11] Patent Number: 5,169,808
[45] Date of Patent: Dec. 8, 1992

[54] METAL CARBIDE PRODUCTION FROM CARBOXYLATE PRECURSORS

[75] Inventors: Thomas A. Gallo, Thornwood; Carl C. Greco, Garnerville, both of N.Y.

[73] Assignee: Akzo nv, Arnhem, Netherlands

[21] Appl. No.: 870,189

[22] Filed: Apr. 10, 1992

Related U.S. Application Data

[63] Continuation of Ser. No. 660,390, Feb. 25, 1991, abandoned.

[51] Int. Cl.$^5$ .......................... C04B 35/56; C01G 1/04
[52] U.S. Cl. ............................................ 501/87; 501/88; 423/417; 423/418; 423/440; 423/492; 528/26
[58] Field of Search ................... 501/87, 88; 423/416, 423/417, 418, 440, 492; 528/26

[56] References Cited

U.S. PATENT DOCUMENTS

| | | | |
|---|---|---|---|
| 3,865,745 | 2/1975 | Block et al. | 423/440 |
| 4,622,215 | 11/1986 | Janey | 423/440 |
| 4,826,666 | 5/1989 | Laine | 423/440 |
| 4,857,490 | 8/1989 | Johnson | 501/87 |
| 4,948,762 | 8/1990 | Krumbe et al. | 423/440 |

*Primary Examiner*—Mark L. Bell
*Assistant Examiner*—Sue Hollenbeck
*Attorney, Agent, or Firm*—Richard P. Fennelly; Louis A. Morris

[57] ABSTRACT

Metal carbides can be formed by the pyrolysis of a composition comprising metal and carboxylic acid residues bonded therein, the composition being substantially free of extraneous carbon and also having metal moieties that are not in the substituent position. Dicarboxylic acids, for example, can be reacted with either metal alkoxides or metal halides to form an oligomer or polymer which can be calcined to the metal carbide. Alternatively, a metal alkoxide can be reacted with a monocarboxylic acid to form a metal alkoxide carboxylate which can be heated to the metal carbide. Finally, a metal carboxylate can be heated to form the desired metal carbide.

7 Claims, No Drawings

METAL CARBIDE PRODUCTION FROM CARBOXYLATE PRECURSORS

This is a continuation of application Ser. No. 07/660,390 filed Feb. 25, 1991, now abandoned.

BACKGROUND OF THE INVENTION

Metal carbides can be made from a metal source and a carbon source, via pyrolysis, using a number of sources of metal and carbon, respectively. Some prior art references which relate to the present invention include the following:

U.S. Pat. No. 3,976,749 to H. Wedemeyer teaches the formation of monocarbides of metals by forming a mixture of carbon with an oxalate of the metal and then decomposing the metal oxalate in the presence of the external source of carbon in a stream of hydrogen.

Japanese Patent Publication No. 54/107,500 also teaches the use of a source of extraneous carbon with an organic titanic ester in order to form titanium carbide fine powder ceramics.

M. A. Janney in U.S. Pat. No. 4,622,215 proposed that titanium carbide powder could be formed from a carbon precursor polymer and an organotitanate as reagents. The titanium moieties in the resulting product are deemed to be substituents to the polymer chain(s) carrying the carbon moieties in the reaction product which is then converted into the desired ceramic after pyrolysis. The patent mentions that a gel is formed.

U.S. Pat. No. 4,948,762 forms carbides by reacting metal-containing compounds with a reactive hydrocarbon-containing compound, which is polymerizable and which contains a carbon-hydroxy bond. J. D. Birchall et al., in U.S. Pat. Nos. 4,861,735 and 4,950,626 also describes the production of ceramic materials by reacting a compound containing a metallic or non-metallic element having at least two groups that are hydroxy-reactive with an organic compound containing at least two hydroxy groups. In U.S. Pat. No. 4,861,735 it is stated in the first Example that the carbide precursor is formed as a waxy solid.

DESCRIPTION OF THE INVENTION

The present invention relates to the formation of metal carbide products which comprises the pyrolysis of a composition that comprises metal and carboxylic acid residues bonded therein. The composition is substantially free of "extraneous" carbon such as is required in the first two patent documents mentioned under the BACKGROUND OF THE INVENTION section of this application. In the present precursor the metal moieties are not in a substituent position, as is true in the Janney patent, but the metal moieties are part of the polymer chain or backbone. Unlike the last three patents mentioned in the BACKGROUND OF THE INVENTION section of the present specification, the present invention relies upon the presence of a carboxylic acid residue rather than carbon-hydroxy functionality. Also, the carboxylate precursors formed herein are fine powders which are easy to handle and have good particle size control unlike certain of the waxy or gel-like products of the prior art.

The "metal" component in the reagents used with the present invention is advantageously a transition metal from Groups IVB (e.g., titanium, zirconium, or hafnium), VB (e.g., vanadium, niobium, or tantalum) or VIB (e.g., chromium, molybdenum, or tungsten) of the Periodic Table of the Elements.

The precursors which the applicants' invention calcines can be derived from a variety of sources. The first precursor can be obtained by the reaction of a suitable metal alkoxide and a dicarboxylic acid to form a polymeric precursor which is then heated to form the desired metal carbide. The formula given below shows the formula for formation of the precursor which can be calcined:

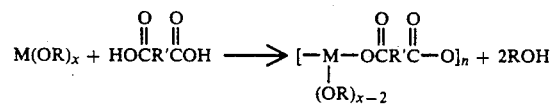

where x is an integer of 2-6, R is alkyl, R' is alkylene, and M is a metal.

In practicing the synthesis of the precursor from the metal alkoxide and dicarboxylic acid, the reaction is run in an appropriate organic solvent in which the acid is soluble. Such polar organic solvents such as the dialkyl ethers, dioxane, tetrahydrofuran, dimethylformamide, or acetonitrile, may be employed. Aromatic hydrocarbon solvents, such as toluene, xylene, or benzene, may also be employed. The reaction mixture of solvent, metal alkoxide, and dicarboxylic acid (at least 1 mole of metal for at least 2 moles of functional acid groups) is then preferably refluxed to remove by-product alcohol.

An alternative to such a reaction is one where a metal halide is substituted for the metal alkoxide. This reaction is shown in the following formula:

where X is halogen, x is an integer of from 2 to 6, R' and M have the same meaning as given above. The two open bonds on M are joined to similar repeat units through their carboxyl residue.

The same general solvent types can be used for this reaction as described above. An amine acid acceptor is used to handle by-product hydrogen halide. An alternative reaction involves the use of the sodium salt of the acid with generation of sodium halide by-product.

In addition to the forgoing schemes which utilize dicarboxylic acids, the present invention can also be practiced with a monocarboxylic acid to form a non-polymeric precursor which can be calcined to the metal carbide. The following formula illustrates this type of reaction:

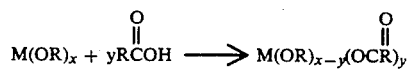

where x can be an integer from 2 to 6 and y can be an integer from 2 to 6.

The same general reaction conditions described for use in the reaction of metal alkoxide with dicarboxylic acid can be used with the monocarboxylic acid reagent.

The present invention is further illustrated by the Examples which follow.

EXAMPLE 1

Into a one liter, 3 neck flask equipped with stirrer, Dean-Stark trap and condenser was added 500 cc of toluene. To this was then added 50 grams (0.176 mole) of tetraisopropyltitanate. The resulting clear solution was heated to 100° C. and 29.2 grams (0.176 mole) of terephthalic acid was added portionwise over a fifteen minute period. The reaction mixture was then heated to reflux and was maintained at reflux for four hours. During this time, 250 cc of solvent was distilled off into the Dean-Stark apparatus. The distillate was shown by IR to contain isopropyl alcohol. The reaction heating was discontinued when the reaction was judged to be substantially completed. The reaction mixture was then allowed to cool to room temperature where it was distilled to dryness under a vacuum of 10 mm of Hg and a pot temperature of 80° C. A fine white powder remained as the product in quantitative yield. Without any purification, this material was used in the conversion to titanium carbide described below (the first four entries in Table I of Examples 8-19).

EXAMPLE 2

The same procedure used in Example 1 was employed except that 56.4 grams of tetra (2-ethylhexyl)-titanate was used with 16.6 grams of terephthalic acid. The yield of desired product was also quantitative. The fifth through seventh listings in Table I, below, show the results of treatment of this precursor to metal carbide.

EXAMPLE 3

The procedure of Example 1 was used except that 20.8 grams of succinic acid was used instead of terephthalic acid. The yield of desired product was also quantitative. The ninth and tenth listing in Table I shows the results of treatment of this precursor.

EXAMPLE 4

The procedure of Example 3 was used except that 25 grams of tetra (2-ethylhexyl)titanate was used as the titanium reactant. The yield of desired product was 95% of theory. Listing eight in Table I is germane to this product.

EXAMPLE 5

Into a one liter, 3 neck flask equipped as in Example 1 was added 500 cc of toluene and 50 grams (0.176 mole) of tetraisopropyltitanate. The resulting clear solution was heated to 100° C and a homogenous mixture of 10.4 grams (0.88 mole) of succinic acid and 14.6 grams (0.88 mole) of terephthalic acid was added over a thirty minute period, in portions. The mixture was then refluxed for three hours, during which time 200 cc of solvent was distilled off. The reaction mixture was then allowed to cool to room temperature, and the entire reaction mixture was then distilled to dryness under a vacuum of 10 mm of Hg. A light brown powdery material (52 grams) remained as the product. The yield was 95% of theory based on the desired compound. The twelfth listing in Table I pertains to this product.

EXAMPLE 6

Into a 500 cc, 3 neck flask equipped with stirrer and Dean-Stark trap was dissolved 24.4 grams (0.2 mole) of benzoic acid in 300 cc of toluene. To this was added 28.4 grams (0.1 mole) of tetraisopropyltitanate over a five minute period. The reaction was heated to reflux and a clear solution resulted. The mixture was refluxed for three hours during which time about 100 cc of solution was azeotroped off into the Dean-Stark trap. The mixture was then cooled, and entire reaction mixture was distilled to dryness. A solid (38 grams) remained as the product (diisopropoxy titanium dibenzoate). The yield was 93% of theory. The eleventh listing in Table I pertains to this product.

EXAMPLE 7

The procedure of Example 5 was used except that 23 grams (0.14 mole) of terephthalic acid and 7.1 grams (0.06 mole) of succinic acid were used as the reactants. The yield of desired product was 95% of theory. The fourteenth listing in Table I gives the results.

EXAMPLE 8

The procedure of Example 7 was used except that tetrahydrofuran was used as the solvent and the heating was at 50° C. The thirteenth listing in Table I gives the results.

EXAMPLES 9-22

Tetraisopropyltitanate (TIPT, $Ti(OC_3H_7)_4$) and tetra 2-ethylhexyltitanate (TEHT, $Ti(OC_8H_{17})_4$) were used as obtained from Akzo Chemicals Inc. Modified titanium alkoxides were synthesized reactions of TIPT and TEHT in toluene or tetrahydrofuran solvent with organic compounds containing one to two carboxylic acid groups as described in foregoing Examples 1-8. Isopropanol was removed from the reaction mixtures by distillation. The precursors were calcined in air to measure the oxide/metals content and $Ar/H_2$ to measure the carbide content. Carbides formed were oxidized to estimate the carbon content. Carbide calcination was carried out in an alumina tube furnace at 1500°-1600° C. for four hours under Ar/4% $H_2$. Ceramic products were characterized by powder XRD, carbon analysis, and/or optical microscopy. Approximate chemical formulas for the metal carbide precursors investigated are listed in Table 1 given below. The XRD results reported refer to samples calcined under $Ar/H_2$.

TABLE I

| Precursor Line Formula | Molec. Wt. | Post-Reduction Morphology | XRD Results |
|---|---|---|---|
| Ti(OiPr)2—OOCC6H4COO— | 330.20 | fine black powder | TiC |
| Ti(OiPr)2—OOCC6H4COO— | 330.20 | fine black powder | — |
| Ti(OiPr)2—OOCC6H4COO— | 330.20 | fine black powder | TiC, LS |
| Ti(OiPr)2—OOCC6H4COO— | 330.20 | fine black/grey powder | TiC |
| Ti(O-2 ethylhexyl)2OOCC6H4COO | 458.46 | grey black powder | — |
| Ti(O-2 ethylhexyl)2OOCC6H4COO | 458.46 | grey black powder | TiC |
| Ti(O-2 ethylhexyl)2OOCC6H4COO | 458.46 | grey black powder | TiC |
| Ti(O-2 ethylhexyl)2OOCC2H4COO | 410.41 | | — |
| Ti(OiPr)2—OOCH2CH2OO— | 282.15 | coarse brown gold shinny | TiC, LS |
| Ti(OiPr)2—OOCH2CH2OO— | 282.15 | coarse brown gold shinny | TiC, LS |

TABLE I-continued

| | | | | | |
|---|---|---|---|---|---|
| Ti2(OiPr)2(OOCC6H5)2 | | 408.31 | coarse brown powder | | TiC, Ti2O3 |
| Ti2(OiPr)2(O2CC6H4CO2).5(O2CC2H4CO2).5 | | 306.17 | grey/black, sl. agglom. | | TiC |
| Ti(OiPr)2(O2C6H4CO2).7(O2CC2H4CO2).3 | | 315.78 | | | assumed TiC |
| Ti(OiPr)2(O2C6H4CO2).7(O2CC2H4CO2).3 | | 315.78 | grey/black, v. agglom. | | TiC |

| Metal Carbide | | | Carbon | Wt. Gain | Surf. Area |
|---|---|---|---|---|---|
| (% Theor.) | (% Exper.) | (% of Theor.) | % | O | (m²/gm) |
| 18.14 | 18.76 | 103.40 | | 14.75 | |
| 18.14 | 19.22 | 105.93 | | 11.10 | |
| 18.14 | 21.53 | 118.66 | | | |
| 18.14 | 18.61 | 102.57 | 32.83 | 10.13 | 298 |
| 13.07 | 12.33 | 94.36 | | 26.93 | |
| 13.07 | 12.42 | 95.04 | | | |
| 13.07 | 13.18 | 100.86 | 28.3 | 18.32 | 18 |
| 14.60 | 24.81 | 169.96 | | 18.78 | |
| 21.23 | 23.31 | 109.78 | 7.02 | 24.09 | |
| 21.23 | 29.90 | 140.82 | 7.95 | 25.77 | 0.43 |
| 14.67 | 14.79 | 100.80 | 3.27 | 17.90 | |
| 19.57 | 18.61 | 95.11 | 13.7 | 30.23 | 1.7 |
| 18.97 | 20.60 | 108.58 | 20.9 | 27.13 | |
| 18.97 | 18.03 | 95.03 | 17.6 | 32.08 | |

EXAMPLE 23

The procedure of Example 5 was used with 20.8 gm of succinic acid and 50 gm of tetraisopropyltitanate in 500 cc of tetrahydrofuran. The reaction started out as a clear solution. When the solution started to become turbid, hexane was added and the tetrahydrofuran was distilled off. This caused rapid precipitation of the polymer. Scanning electron microscope micrographs of the dried material showed a primary particle size of 0.1 to 1 micron. The particles were present in agglomerates of about 1-10 microns.

EXAMPLE 24

This Example illustrates that the measured particle size of the powders derived using the present invention depends on the primary particle size and state of agglomeration. (Relatively unagglomerated titanium carbide precursor has an average particle size of about 4.6 microns with 80% being less than 12 microns).

The Table set forth below shows the surface area versus temperature as the precursor from Example 8 is heated. Although a small fraction of the surface area may be due to free carbon, the powders have a very high surface area and are easily sinterable. The data in the Table illustrate that by 1400° C. the material has begun to sinter as evidenced by a loss of surface area:

| Tem. (°C.) | Surface Area (m²/gm) |
|---|---|
| 200 | 273 |
| 600 | 244 |
| 800 | 317 |
| 1000 | 422 |
| 1400 | 255 |
| 1600 | 158 |

It is deemed that these high surface area powders should also have utility as catalysts and as catalyst supports.

We claim:

1. A process for forming a pyrolyzable composition, which can be pyrolyzed to form a metal carbide, said pyrolyzable composition comprising the polymeric reaction product of a metal which contains substituents which are reactive with carboxylic acids and a dicarboxylic acid wherein the reagent containing the metal moieties are caused to react with said dicarboxylic acid so as to form a polymeric composition containing said metal moieties within the polymeric backbone of said composition and not in a substituent position, and wherein said pyrolyzable composition is substantially free of extraneous carbon.

2. A process as claimed in claim 1 wherein the substituents are alkoxy.

3. A process as claimed in claim 1 wherein the substituents are halogen.

4. A process as claimed in claim 1 wherein the pyrolyzable composition has the repeat unit

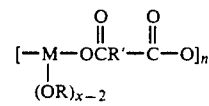

where x is an integer from 2 to 6, R is alkyl, R' is alkylene, and M is a metal.

5. A process as claimed in claim 1 wherein the pyrolizable composition has the repeat unit

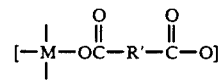

where R' is alkylene, M is a metal, and the two open bonds on M are joined to similar repeat units through their carboxyl residue.

6. A process as claimed in claim 4 wherein M is a metal selected from the group consisting of Group IVB, Group VB and Group VIB of the Periodic Table of the Elements.

7. A process as claimed in claim 5 wherein M is a metal selected from the group consisting of Group IVB, Group VB and Group VIB of the Periodic Table of the Elements.

* * * * *